US007607148B2

(12) United States Patent
Feinberg et al.

(10) Patent No.: US 7,607,148 B2
(45) Date of Patent: Oct. 20, 2009

(54) METHOD AND APPARATUS FOR MONITORING AN INFORMATION DISTRIBUTION SYSTEM

(75) Inventors: Brian Feinberg, Cupertino, CA (US); Eugene Gershtein, Redwood City, CA (US); Donald F Gordon, Los Altos, CA (US); Yong Ho Son, Palo Alto, CA (US); Sadik Bayrakeri, Foster City, CA (US)

(73) Assignee: Cox Communications, Inc., Atlanta, GA (US)

( * ) Notice: Subject to any disclaimer, the term of this patent is extended or adjusted under 35 U.S.C. 154(b) by 947 days.

(21) Appl. No.: 09/738,959

(22) Filed: Dec. 14, 2000

(65) Prior Publication Data

US 2002/0078440 A1    Jun. 20, 2002

Related U.S. Application Data

(60) Provisional application No. 60/253,417, filed on Nov. 27, 2000.

(51) Int. Cl.
*H04H 20/14*   (2008.01)

(52) U.S. Cl. .............................. 725/22; 725/14; 725/15; 725/16; 725/17; 725/18; 725/19; 725/107; 348/180

(58) Field of Classification Search .............. 725/14–20, 725/22, 107; 348/180
See application file for complete search history.

(56) References Cited

U.S. PATENT DOCUMENTS

| 3,746,780 | A | * | 7/1973 | Stetten et al. ................. 386/95 |
| 4,547,804 | A | * | 10/1985 | Greenberg ................... 348/460 |
| 5,504,519 | A | * | 4/1996 | Remillard .................... 725/10 |
| 5,640,537 | A | * | 6/1997 | Jessen et al. .................. 703/23 |
| 6,088,722 | A | * | 7/2000 | Herz et al. ................... 709/217 |
| 6,108,637 | A | * | 8/2000 | Blumenau ...................... 705/7 |
| 6,269,484 | B1 | * | 7/2001 | Simsic et al. ............... 725/151 |
| 2002/0010935 | A1 | * | 1/2002 | Sitnik .......................... 725/78 |
| 2005/0028208 | A1 | * | 2/2005 | Ellis et al. .................... 725/58 |

OTHER PUBLICATIONS

Richardson et al, Virtual Network Computing, Jan 1998, IEEE, IEEE Internet Computing—vol. 2, No. 1.*

* cited by examiner

*Primary Examiner*—Annan Q Shang
*Assistant Examiner*—Sumaiya A Chowdhury
(74) *Attorney, Agent, or Firm*—Merchant & Gould

(57) ABSTRACT

Techniques to monitor operation of an information distribution system and delivery of programming, guide data, and other information by the system. These techniques may be used for diagnostics, quality control, and other purposes, and for various types of systems. In accordance with one method, a directive is received to monitor a particular channel at a particular terminal. In response to the received directive, a command is sent (e.g., via a remote control unit) to the terminal. Contents are then received from the terminal, captured, and reported. The reported contents may be used to visually verify the contents being delivered to the terminals, check what the viewers may observe, mimic and test interactive experiences of the viewers, observe actual viewing conditions at the terminals, and perform other tests and diagnostics. The received contents may be captured as one or more video frames, as a video sequence, or in some other format.

20 Claims, 10 Drawing Sheets

METHOD AND APPARATUS FOR MONITORING AN INFORMATION DISTRIBUTION SYSTEM

CROSS-REFERENCES TO RELATED APPLICATIONS

This application claims the benefit of U.S. provisional Application Ser. No. 60/253,417, entitled "METHOD AND APPARATUS FOR INTERACTIVE PROGRAM GUIDE AND ADVERTISING SYSTEM," filed Nov. 27, 2000, which is incorporated herein by reference in its entirety for all purposes.

BACKGROUND OF THE INVENTION

The present invention relates to communication systems in general. More specifically, the invention relates to techniques to efficiently deliver interactive program guide (IPG) and other multimedia information in a server-centric system.

Over the past few years, the television industry has seen a transformation in a variety of techniques by which its programming is distributed to consumers. Cable television systems are doubling or even tripling system bandwidth with the migration to hybrid fiber coax (HFC) cable plant. Direct broadcast satellite (DBS) systems have also emerged as a viable alternative to customers unwilling to subscribe to local cable systems. A variety of other approaches have also been attempted, which focus primarily on high bandwidth digital technologies, intelligent two-way set top terminals, or other methods to try to offer services differentiated from those of standard cable and over-the-air broadcast systems.

With the increase in bandwidth, the number of programming choices has also increased. Leveraging off the availability of more intelligent set top terminals (STTs), several companies have developed elaborate systems for providing an interactive listing of a vast array of channel offerings, expanded textual information about individual programs, and the ability to look forward as much as several weeks in advance to plan television viewing.

Unfortunately, the existing program guides have several drawbacks. First, these guides tend to require a significant amount of memory at the set top terminal. Second, the terminals may be very slow to acquire the current database of programming information when they are turned on for the first time or are subsequently restarted (e.g., a large database may be downloaded to a terminal using only a vertical blanking interval (VBI) data insertion technique). Such slow database acquisition may disadvantageously result in out of date information or, in the case of services such as pay-per-view (PPV) or video-on-demand (VOD), limited scheduling flexibility for the information provider. Third, the user interface of existing program guides do not usually look like a typical television control interface; rather the user interface looks like a 1980's style computer display (i.e., having blocky, ill-formed text and/or graphics).

For a system designed to distribute information (e.g., programming, guide data, and so on) to a large number of terminals, it is highly desirable to monitor and verify that the system is operating properly. Techniques that may be employed to achieve this are highly desirable.

SUMMARY OF THE INVENTION

The invention provides techniques to monitor operation of an information distribution system and the delivery of programming, guide data, and other information by the system. These techniques may be used for diagnostics, quality control, and other purposes, and may be advantageously employed for various types of information distribution system such as, for example, an interactive program guide (IPG) delivery system, a video-on-demand (VOD) system, and other systems. These techniques allow a system operator to visually verify the contents being delivered to the terminals, check what the viewers may observe, mimic and test interactive experiences of the viewers, observe actual viewing conditions at the terminals, and perform other tests and diagnostics.

An embodiment of the invention provides a method for monitoring operation of an information distribution system. In accordance with the method, a directive is received to monitor a particular channel at a particular terminal. In response to the received directive, a command is sent (e.g., via a remote control unit) to the terminal. Contents are then received from the terminal, captured, and reported. The reported contents may be used to verify proper delivery of contents by the information distribution system, proper operation of a user interface at the terminal, and/or for other purposes. The received contents may be captured as one or more video frames, as a video sequence, or in some other format.

Another embodiment of the invention provides a monitoring system capable of monitoring operation of an information distribution system. The monitoring system includes one or more terminals (e.g., of different models) and a control unit. Each terminal is capable of receiving commands and providing requested contents. The control unit receives a directive to monitor a particular channel at a particular terminal (i.e., selected from among the one or more terminals), sends a command to the selected terminal, receives contents from the selected terminal, and captures and reports the received content. The monitoring system may further include a monitor and control unit that provides directives to monitor selected channels at selected terminals. These directives may be sent to test user interaction at the selected terminals, verify proper delivery of contents to the selected terminals, and so on.

The invention further provides other methods and system elements that implement various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

The teachings of the invention can be readily understood by considering the following detailed description in conjunction with the accompanying drawings.

To facilitate understanding, identical reference numerals have been used, where possible, to designate identical elements that are common within a figure.

DESCRIPTION OF THE SPECIFIC EMBODIMENTS

A. SYSTEM

Figure 1:
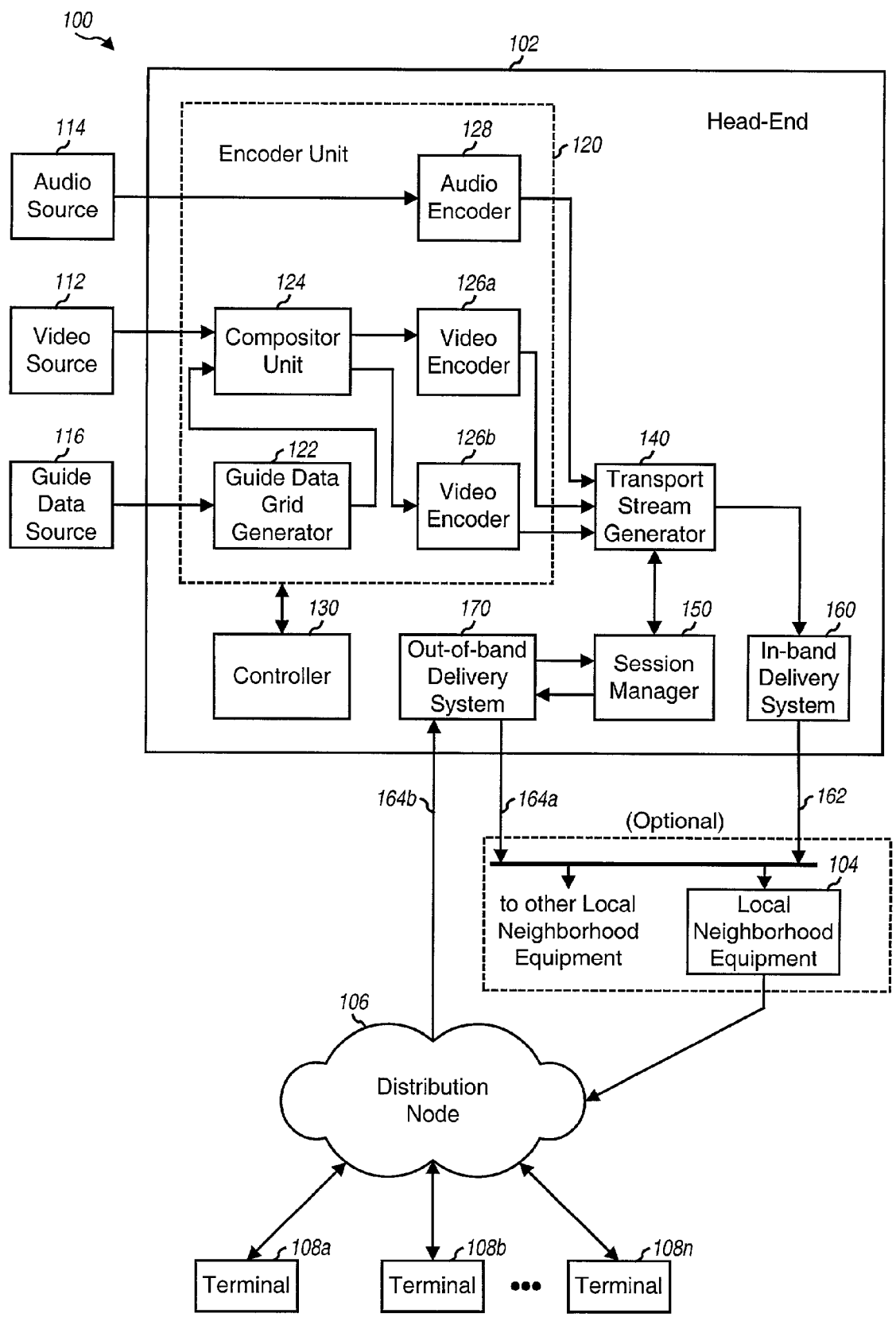
FIG. 1 is a block diagram of an embodiment of an information distribution system that can be used to provide interactive program guide (IPG) and is capable of implementing various aspects of the invention.

FIG. 1 is a block diagram of an embodiment of an information distribution system 100 that can be used to provide interactive program guide (IPG) and is capable of implementing various aspects of the invention. Distribution system 100 includes a head-end 102, (optional) local neighborhood equipment (LNE) 104, one or more distribution nodes 106 (e.g., a hybrid fiber-coax network), and a number of terminals 108 (e.g., set top terminals). Each LNE 104 may serve one or more distribution nodes 106, and each distribution node 106 is typically associated with a respective neighborhood that includes a number of terminals 108.

Head-end 102 produces a number of digital streams that contain encoded information in (e.g., MPEG-2) compressed format. These digital streams are then modulated using a modulation technique that is compatible with a communication channel 162 that couples head-end 102 to LNE 104 and/or distribution node 106. LNE 104 is typically located away from head-end 102. LNE 104 selects data for viewers in the LNE's neighborhood and re-modulates the selected data into a form suitable for transmission to the associated distribution node(s) 106. Although system 100 is depicted as having head-end 102 and LNE 104 as separate elements, the functions of LNE 104 may be incorporated into head-end 102. Also, the elements of system 100 can be physically located anywhere, and need not be near each other.

In distribution system 100, program streams may be continually transmitted from the head-end to the terminals (i.e., broadcast) or may be addressed to particular terminals that requested the information via an interactive menu (referred to herein as "demand-cast"). An interactive menu structure suitable for requesting video-on-demand (VOD) is disclosed in commonly assigned U.S. Pat. No. 6,208,335 entitled "METHOD AND APPARATUS FOR PROVIDING A MENU STRUCTURE FOR AN INTERACTIVE INFORMATION DISTRIBUTION SYSTEM," and incorporated herein by reference. Another example of an interactive menu suitable for requesting multimedia services is an interactive program guide disclosed in commonly assigned U.S. Pat. No. 6,754,905 entitled "DATA STRUCTURE AND METHODS FOR PROVIDING AN INTERACTIVE PROGRAM GUIDE," and incorporated herein by reference.

Figure 2A:
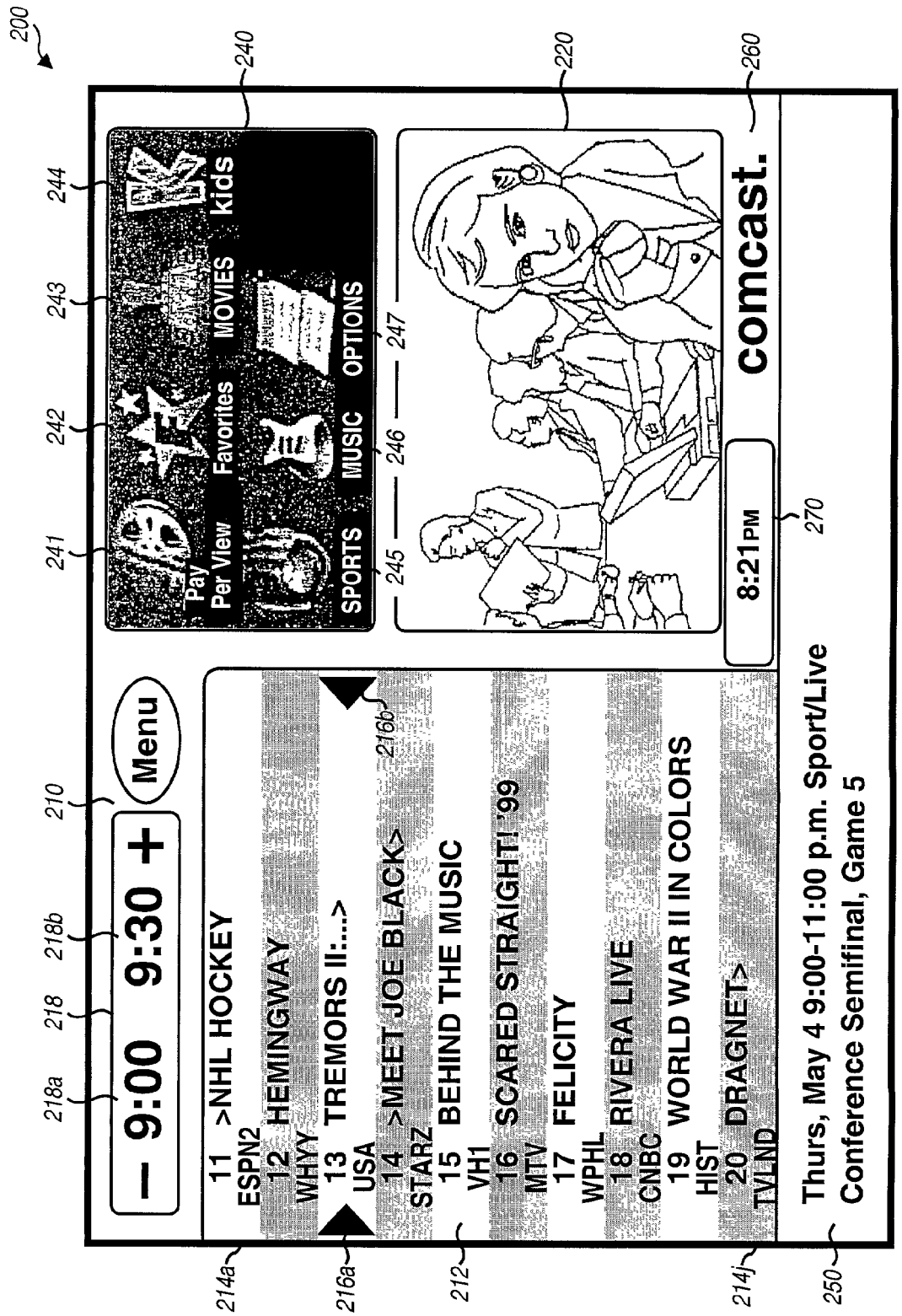
FIG. 2A is a diagram of a specific design of an IPG page used to present a program listing and other information to viewers.

To assist a viewer to select programming, head-end 102 produces information that can be assembled to create an "IPG page" such as that shown in FIG. 2A. Head-end 102 produces the components of the IPG page as bitstreams that are compressed prior to transmission. Terminals 108 thereafter receive and demodulate the transmission from head-end 102 and decode the compressed bitsteams to retrieve the IPG pages.

Within distribution system 100, a video source 112 supplies one or more video sequences for a video portion of the IPG pages (also referred to herein as "barker" videos), an audio source 114 supplies one or more audio signals associated with the video sequences, and a guide data source 116 provides program guide data for a guide portion of the IPG pages. The guide data is typically stored and provided in a particular (e.g., text) format, with each guide entry describing a particular program by its title, presentation time, presentation date, descriptive information, channel, and program source. The video sequences, audio signals, and program guide data are provided to an encoder unit 120 within head-end 102.

Encoder unit 120 (which is described in further detail below) compresses the received video sequences into one or more elementary streams, the audio signals into one or more elementary streams, and the guide videos produced from the guide data into one or more elementary streams. The elementary streams can be produced using a number of encoding techniques such as, for example, "picture-based" encoding, "slicebased" encoding, "temporal slice persistence" (TSP) encoding, "strobecast", as well as other types of encoding, or a combination thereof.

Picture-based encoding is described in detail in U.S. Pat. No. 6,621,870, entitled "METHOD AND APPARATUS FOR COMPRESSING VIDEO SEQUENCES." filed Aug. 27, 1999. Slice-based encoding is described in detail in U.S. Pat. No. 6,651,252, entitled "METHOD AND APPARATUS FOR TRANSMITTING VIDEO AND GRAPHICS IN COMPRESSED FORM" Temporal slice persistence encoding is described in detail in U.S. patent application Ser. No. 09/686.739, entitled "TEMPORAL SLICE PERSISTENCE METHOD AND APPARATUS FOR DELIVERY OF INTERACTIVE PROGRAM GUIDE," flied Oct. 10, 2000 (now U.S. Pat. No. 6,754,271, issued Jun. 22, 2004). Strobecast encoding and delivery is described in detail in U.S. patent application Ser. No. 09/687,662, entitled "EFFICIENT DELIVERY OF INTERACTIVE PROGRAM GUIDE USING DEMAND-CAST," filed Oct. 12, 2000. These applications are assigned to the assignee of the invention and Incorporated herein by reference.

In the specific embodiment shown in FIG. 1, encoder unit 120 includes a guide data grid generator 122, a compositor unit 124, video encoders 126a and 126b, and an audio encoder 128. Additional video and/or audio encoders may also be included within encoder unit 120, depending on the particular head-end design. Guide data grid generator 122 receives and formats the guide data into a "guide grid", e.g., guide grid region 212 in FIG. 2A.

Figure 2B:
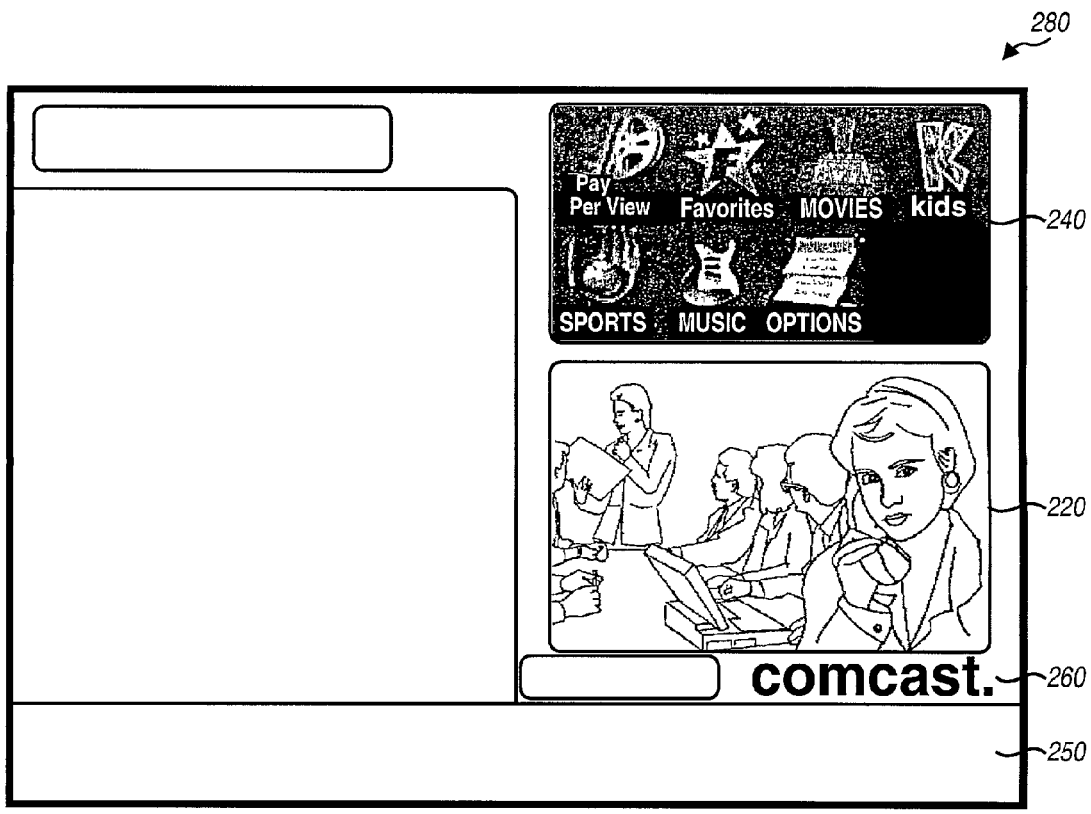
FIGS. 2B and 2C are diagrams of an embodiment of a background video and a guide video, respectively, for the IPG page shown in FIG. 2A.
Figure 2C:
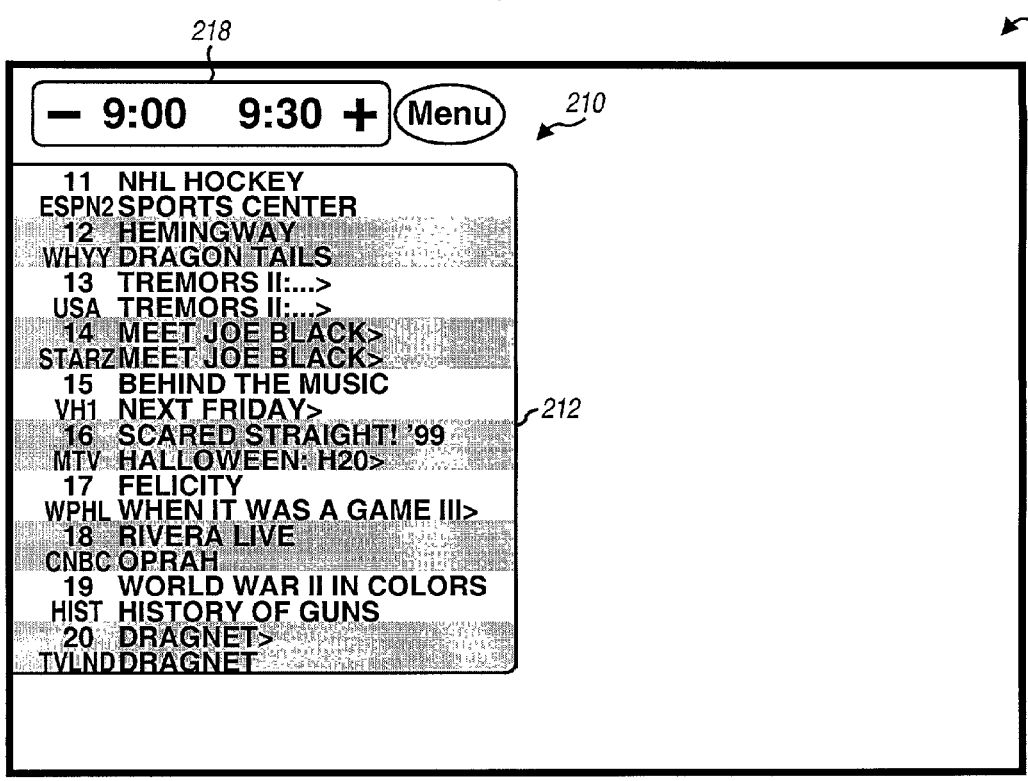

Compositor unit 124 receives and combines the guide grid from grid generator 122 and a video sequence from video source 112, and may further insert advertising video, advertiser or service provider logos, still graphics, animation, other information, or a combination thereof. In an embodiment, compositor unit 124 provides a background video (e.g., as shown in FIG. 2B) to a first video encoder 126a and a guide video (e.g., as shown in FIG. 2C) to a second video encoder 126b. For picture-based encoding, compositor unit 124 provides a composed video (e.g., as shown in FIG. 2A) to one video encoder. A number of encoders can be used to encode in parallel a number of composed videos for a number of IPG pages, with each IPG page including different guide content.

In an embodiment, video encoder 126a is a real-time (e.g., MPEG-2) encoder that encodes the background video using a particular encoding technique, and provides one or more (e.g., MPEG-2 compliant) bitstreams for the background portion of the IPG page. In an embodiment, video encoder 126b is a (e.g., software-based) encoder that encodes the guide video using a particular encoding technique, and provides one or more bitstreams that collectively represent all or a portion of the guide grid. Each video encoder 126 is designed to efficiently and effectively encode the respective input video, and may be operated in accordance with slice-based, picture-based, temporal slice persistence, or some other encoding technique. Audio encoder 128 (e.g., an AC-3 encoder) receives and encodes the audio signals to form a bitstream for the audio signals. The video and audio encoders provide a number of elementary streams containing (e.g., picture-based or slice-based) encoded video and audio information.

For some applications such as picture-in-picture (PIP) or picture-in-application (PIA), compositor unit 124 may receive a number of video sequences and form a composed video having included therein the video sequences in scaled form (i.e., reduced in size). For example, nine video sequences may be compressed and arranged into a 3×3 grid. Video encoder 126a then receives and (e.g., slice-based) encodes the composed video and produces a number of elementary streams, one stream for each video sequence. Each video sequence can thereafter be individually transmitted from the head-end and flexibly recombined with other (e.g., guide) data and/or video at the terminal (e.g., to implement PIP or PIA). PIP and PIA are described in further detail in U.S. patent application Ser. No. 09/635,508, entitled "METHOD AND APPARATUS FOR TRANSITIONING BETWEEN INTERACTIVE PROGRAM GUIDE (EPG) PAGES," filed Aug. 9, 2000, assigned to the assignee of the invention and incorporated herein by reference.

A controller 130 couples to encoder unit 120 and manages the overall encoding process such that the video encoding process is temporally and spatially synchronized with the grid encoding process. For slice-based encoding, this synchronization can be achieved by defining the slice start and stop (macroblock) locations for each slice and managing the encoding process based on the defined slices. Slices may be defined, for example, according to the objects in the IPG page layout.

The encoding process generates a group of pictures (GOP) structure having "intra-coded" (I) pictures and "predicted" (P and B) pictures. For slice-based encoding, the I pictures include intra-coded slices and the P and B pictures include predictive-coded slices. In an embodiment, the intra-coded slices are separated from the predictive-coded slices and transmitted from the head-end via separate packet identifiers (PIDs). Although not shown in FIG. 1, the coded slices may be stored in a storage unit. The individual slices can thereafter be retrieved from the storage unit as required for transmission from the head-end.

A transport stream generator (TSG) 140 receives and assembles the elementary streams from the video and audio encoders into one or more transport streams. Transport stream generator 140 further manages each transport stream and communicates with a session manager 150 to form and/or tear down transport streams. In an embodiment, each transport stream is an MPEG-compliant transport stream. In this case, transport stream generator 140 may send program tables to terminals 108 in a private section of the MPEG transport stream. Such table may include a list of available streams along with the address of the source transport stream generator and other information to identify the particular transport stream to which the table belongs.

Session manager 150 manages the delivery of IPG pages to terminals 108 located on one or more distribution nodes 106. In an embodiment, each distribution node 106 is served by a respective set of one or more transport streams generated by a transport stream generator assigned to that node. The transport streams for each distribution node include broadcast streams (e.g., for IPG pages continually sent from the head-end) and demand-cast streams (e.g., for IPG pages sent from the head-end in response to requests from the terminals). For some implementations, session manager 150 may monitor the demand-cast streams and usage by terminals 108 and direct the appropriate transport stream generator to generate or tear down demand-cast streams.

An in-band delivery system 160 (e.g., a cable modem) receives and modulates the transport streams from transport stream generator 140 using a modulation format suitable for transmission over communication channel 162, which may be, for example, a fiber optic channel that carries high-speed data from the head-end to a number of LNE and/or distribution nodes. Each LNE selects the programming (e.g., the IPG page components) that is applicable to its neighborhood and re-modulates the selected data into a format suitable for transmission over the associated distribution node(s).

Although not shown in FIG. 1 for simplicity, LNE 104 may include a cable modem, a slice combiner, a multiplexer, and a modulator. The cable modem demodulates a signal received from the head-end and extracts the coded video, guide, data, and audio information from the received signal. The coded information is typically included in one or more transport streams. The slice combiner may recombine the received video slices with the guide slices in an order such that a decoder at the terminals can easily decode the IPG without further slice re-organization. The multiplexer assigns PIDs for the resultant combined slices and forms one or more (e.g., MPEG-compliant) transport streams. The modulator then transmits the transport stream(s) to the distribution node(s).

LNE 104 can be programmed to extract specific information from the signal transmitted by the head-end. As such, the LNE can extract video and guide slices that are targeted to the viewers served by the LNE. For example, the LNE can extract specific channels for representation in the guide grid that can be made available to the viewers served by that LNE. In such case, unavailable channels to a particular neighborhood would not be depicted in a viewer's IPG. The IPG may also include targeted advertising, e-commerce, program notes, and others. To support such features, each LNE may recombine different guide slices with different video slices to produce IPG pages that are prepared specifically for the viewers served by that particular LNE. Other LNEs may select different IPG component information that is relevant for their associated viewers. A detailed description of LNE 104 is described in the aforementioned U.S. patent application Ser. No. 09/635,508.

For a server-centric distribution system, the program guide resides at the head-end and a two-way communication system, via a back channel 164, is utilized to support communication with the terminals for delivery of the program guide. Back-channel 164 can be used by the terminals to send requests and other messages to the head-end, and may also be used by the head-end to send messages and certain types of data to the terminals. An out-of-band delivery system 170 facilitates the exchange of data over the back channel and forwards terminal requests to session manager 150.

Other elements within head-end 102 may also interface with out-of-band delivery system 170 to send information to terminal 108 via the out-of-band network. Fort example, a spotlight server that produces a spotlight user interface (described below) may interface with out-of-band delivery system 170 directly to send spotlight data to terminals 108. Off the shelf equipment including network controllers, modulators, and demodulators such as those provided by General Instrument Corporation can be used to implement out-of-band delivery system 170.

Distribution system 100 is described in further detail in the aforementioned U.S. patent application Ser. Nos. 09/687,662 and 09/686,739. One specific implementation of head-end 102 is known as the DIVA™ System provided by DIVA Systems Corporation.

B. Interactive Program Guide

A unique way of providing programming schedule and listing to viewers is a server-centric approach. In this approach, the complete program guide information spanning a particular time period (e.g., two weeks of programming) is generated at a head-end and sent to the terminals in a display-ready compressed video format.

FIG. 2A is a diagram of a specific design of an IPG page 200 used to present a program listing and other information to viewers. In this design, IPG page 200 includes a guide region 210, a video region 220, an icon region 240, a program description region 250, a logo region 260, and a time-of-day region 270. Other designs for the IPG page with different layouts, configurations, and combinations and arrangements of regions and objects can be contemplated and are within the scope of the invention.

In an embodiment, guide region 210 includes a guide grid region 212 and a time slot region 218. Time slot region 218 includes a first time slot object 218a and a second time slot object 218b that indicate the (e.g., half-hour) time slots for which program guide is being provided on the IPG page. Guide grid region 212 is used to display program listing for a group of channels. In the design shown in FIG. 2A, the program listing shows the available programming in two half-hour time slots. Guide grid region 212 includes a number of channel objects 214a through 214j used to display program information for the group of channels. A pair of channel indicators 216a and 216b within guide grid region 212 identifies the current cursor location.

Program description region 250 is used to present descriptive information relating to a particular program selected from the program listing, or may be used to present other information. Video region 220 may be used to display images, videos, text, or a combination thereof, which may be used for advertisements, previews, or other purposes. In the design shown in FIG. 2A, video region 220 displays a barker video. Logo region 260 may include a logo of a service operator or other entity, and may be optionally displayed. Time-of-day region 270 may be configured by the user and may also be optionally displayed.

Icon region 240 is used to display various icons. Each icon can represent a filter or a link to either another IPG page or a particular interface. Each filter selects a particular type of programming to be included in the program listing shown in guide region 210. For example, a "Pay Per View" (PPV) icon 241 may be a filter that selects only PPV programming to be included in the program listing. A "Favorites" icon 242 may be a filter that selects only channels designated by the viewer to be among his or her favorites. A "Movies" icon 243 may be a filter that selects only movies or movie channels. A "Kids" icon 244 may be a filter that selects only channels for children or programming appropriate or produced for viewing by children. A "Sports" icon 245 may be a filter that selects only sports channels or sports-related programming. A "Music" icon 246 may be a link to a music interface. And an "Options" icon 247 may be a link to a menu of IPG options that the viewer may select amongst. Such options may include (1) configuration and selection/deselection information of IPG related services, (2) custom information for deactivating some of the filters or accessing a custom condensed listing menus, and (3) other features and functionality.

FIG. 2B is a diagram of an embodiment of a background video 280 for IPG page 200. In this embodiment, background video 280 includes video region 220, icon region 240, program description region 250, and logo region 260. As noted above, background video 280 can be efficiently (slice-based) encoded by a video encoder. In other designs, background video 280 may include additional and/or different regions than that shown in FIG. 2B.

FIG. 2C is a diagram of an embodiment of a guide video 290 for IPG page 200. In this embodiment, guide video 290 includes guide region 210, which includes guide grid region 212 and time slot region 218. Guide video 290 can also be efficiently (slice-based) encoded by a video encoder. In other designs, guide video 290 may include additional and/or different regions than that shown in FIG. 2C.

As shown in FIG. 2C, two program titles are provided for each channel object 214 in guide grid region 212, with each title corresponding to a respective half-hour time slot. In an embodiment, a "mask or reveal" feature can be used to display (i.e., reveal) a desired program title and hide (i.e., mask) the other program title. For example, channel 12 includes the program titles "Hemingway" and "Dragon Tails". If the 9:00-9:30 time slot is selected (as shown in FIG. 2A), the program title "Hemingway" can be revealed and the other program title "Dragon Tails" can be masked from view. And if the 9:30-10:00 time slot is selected, the program title "Hemingway" can be masked and the other program title "Dragon Tails" can be revealed. The underlying video frame to be encoded can thus include various objects and items, some of which may be shown and others of which may be hidden. This mask or reveal technique can be used for any region of the IPG page.

The mask or reveal feature and the user interaction processing are described in the aforementioned U.S. patent application Ser. Nos. 09/293,526 and 08/984,427.

A program guide for a large number of channels for a long time period can be very extensive. For example, 480 IPG pages would be needed to provide program guide for two weeks of programming for 200 channels, if each IPG page includes a program listing for 10 channels in two half-hour time slots as shown in FIG. 2A. A large amount of system resources (e.g., bandwidth) would be needed to continually transmit the complete program guide.

In an embodiment, to conserve system resources, only a limited number of IPG pages are continually sent (broadcast) by the head-end, and remaining IPG pages may be sent as requested by viewers. The specific number of IPG pages to be broadcasted and their selection are dependent on the particular system implementation, and may be defined by a time depth and a program depth for the program guide. The time depth refers to the amount of time programming for a particular channel group is provided by the broadcast video PIDs. And the channel depth refers to the number of channels available through the program guide (in comparison to the total number of channels available in the system).

In an embodiment, a number of video PIDs can be used to send the program guide for the current and (possibly) near look-ahead time slots, one or more audio PIDs can be used to send an audio barker, and (optionally) one or more data PIDs (or other data transport method) can be used to send the program description data, overlay data, and/or other data. The elementary streams carrying the IPG are sent in one or more transport streams.

For the portion of the program guide that is broadcasted by the head-end, a viewer is able to quickly retrieve and display IPG pages formed from the broadcast streams whenever desired.

If the viewer desires a program listing or other contents that is not provided by the broadcast streams, then a demand-cast session may be initiated, for example, as described in the aforementioned U.S. patent application Ser. Nos. 09/687,662 and 09/686,739. For this demand-cast session, the terminal sends a message to the head-end, via the back channel, requesting the desired contents. The head-end processes the request, retrieves the desired contents from an appropriate source, generates a video stream for the desired contents and assigns it with another video PID (and related audio and data PIDs, if any), and incorporates the video stream into a transport stream. Preferably, the desired video stream is inserted into the transport stream currently being tuned/selected by the requesting terminal or sent in another transport stream. The head-end further informs the terminal which PID should be received and from which transport stream the demand-cast video stream should be demultiplexed. The terminal then retrieves the desired video stream from the transport stream.

C. Data Structures and Encoding Techniques

Figure 3A:
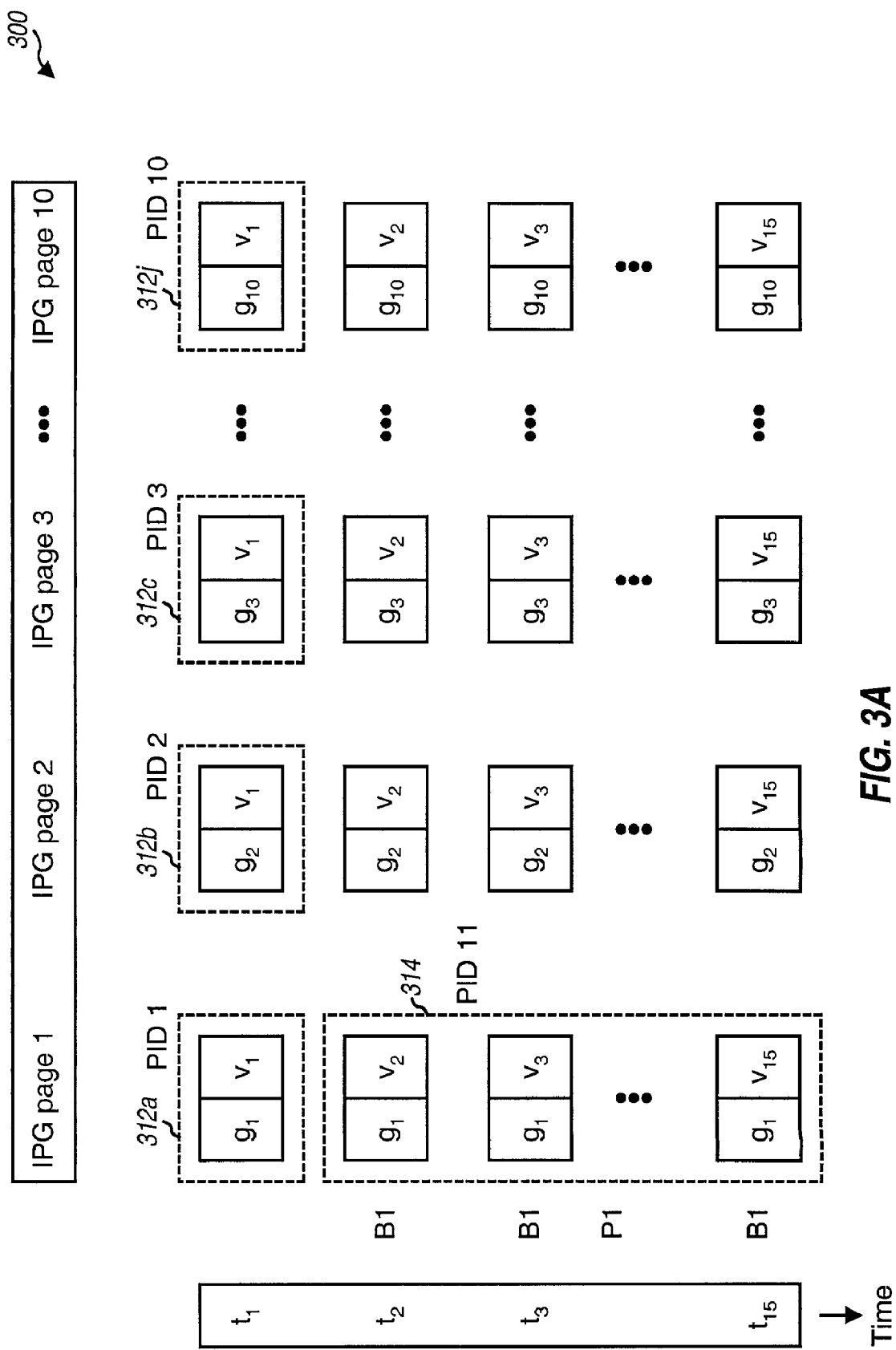
FIGS. 3A through 3C are diagrams of data structures (i.e., matrices) of program guide data for a group of IPG pages, and which may be used in conjunction with picture-based encoding, slice-based encoding, and temporal slice persistence encoding, respectively.

FIG. 3A is a diagram of a data structure 300 (i.e., a matrix) of program guide data for a group of IPG pages, and which may be used in conjunction with picture-based encoding. In this representation, the horizontal axis represents the video sequences for different LPG pages to be transmitted, and the vertical axis represents time indices for the video sequences. In this specific example, ten video sequences are generated and labeled as IPG pages 1 through 10. Each video sequence is composed of a time sequence of pictures. In this specific example, each group of 15 pictures for each video sequence forms a group of pictures (GOP) for that video sequence. Matrix 300 is illustratively shown to include ten GOPs for ten IPG pages, but can be designed to have any defined M×N dimension.

As shown in FIG. 3A, matrix 300 is a two-dimensional array of elements, with each element representing a picture (or frame). For simplicity, each element in matrix 300 is illustratively shown to include a guide portion and a video portion on the left and right halves of the picture, respectively. The element in the first column of the first row represents the guide portion ($g_1$) and video portion ($v_1$) of IPG page 1 at time index $t_1$, the element in the second column of the first row represents the guide portion ($g_2$) and video portion ($v_1$) of IPG page 2 at time index $t_1$, and so on. In the specific example shown FIG. 3A, the guide portion for each IPG page is different (i.e., $g_1, g_2, \ldots, g_{10}$) but the video portion (e.g., $v_1$) is common for all ten IPG pages.

Each of the ten video sequences in matrix 300 can be coded as a GOP. For example, the video sequence for IPG page 1 can be coded as a GOP comprised of the coded picture sequence: I1, B1, B1, P1, B1, B1, P1, B1, B1, P1, B1, B1, P1, B1, and B1, where I represents an intra-coded picture, P represents a uni-directionally predictive-coded picture, and B represents a bi-directionally predictive-coded picture.

In the example shown in FIG. 3A, matrix 300 includes a group of intra-coded pictures 312 and a group of predictive-coded pictures 314 that can be used to fully represent the ten IPG pages. In an embodiment, intra-coded picture group 312 includes ten intra-coded pictures at time index $t_1$ for the ten IPG pages. These intra-coded pictures can be assigned to PIDs 1 through 10, which may also be referred to as I-PIDs 1 through 10 to denote that these PIDs include intra-coded pictures. In an embodiment, predictive-coded picture group 314 includes 14 predictive-coded pictures of one of the IPG pages for time indices $t_2$ through $t_{15}$. Predictive-coded picture group 314 is also assigned a PID, and may also be referred to as the base-PID or PRED-PID to denote that this PID includes predictive-coded pictures. The base-PID may comprise the following picture sequence: B1, B1, P1, B1, B1, P1, B1, B1, P1, B1, B1, P1, B1, and B1.

For each IPG page, between time $t_1$ to $t_{15}$, the guide portion does not change and only the video portion changes. In each column, the 14 prediction error frames contain zero data for the guide portion and video prediction error for the video portion. Therefore, the contents of the base-PID is the same for each IPG page and may be sent only once per group of IPG pages in the matrix for each GOP period.

If a viewer wants to view the guide data for a particular group of channels (i.e., a particular IPG page), a demultiplexer at the terminal selects the I-PID for the selected IPG page and recombines the selected I-PID with the base-PID to produce a recombined stream, which is then decoded by the video decoder. Picture-level recombination is described in further detail in the aforementioned U.S. patent application Ser. No. 09/686,739.

Figure 3B:
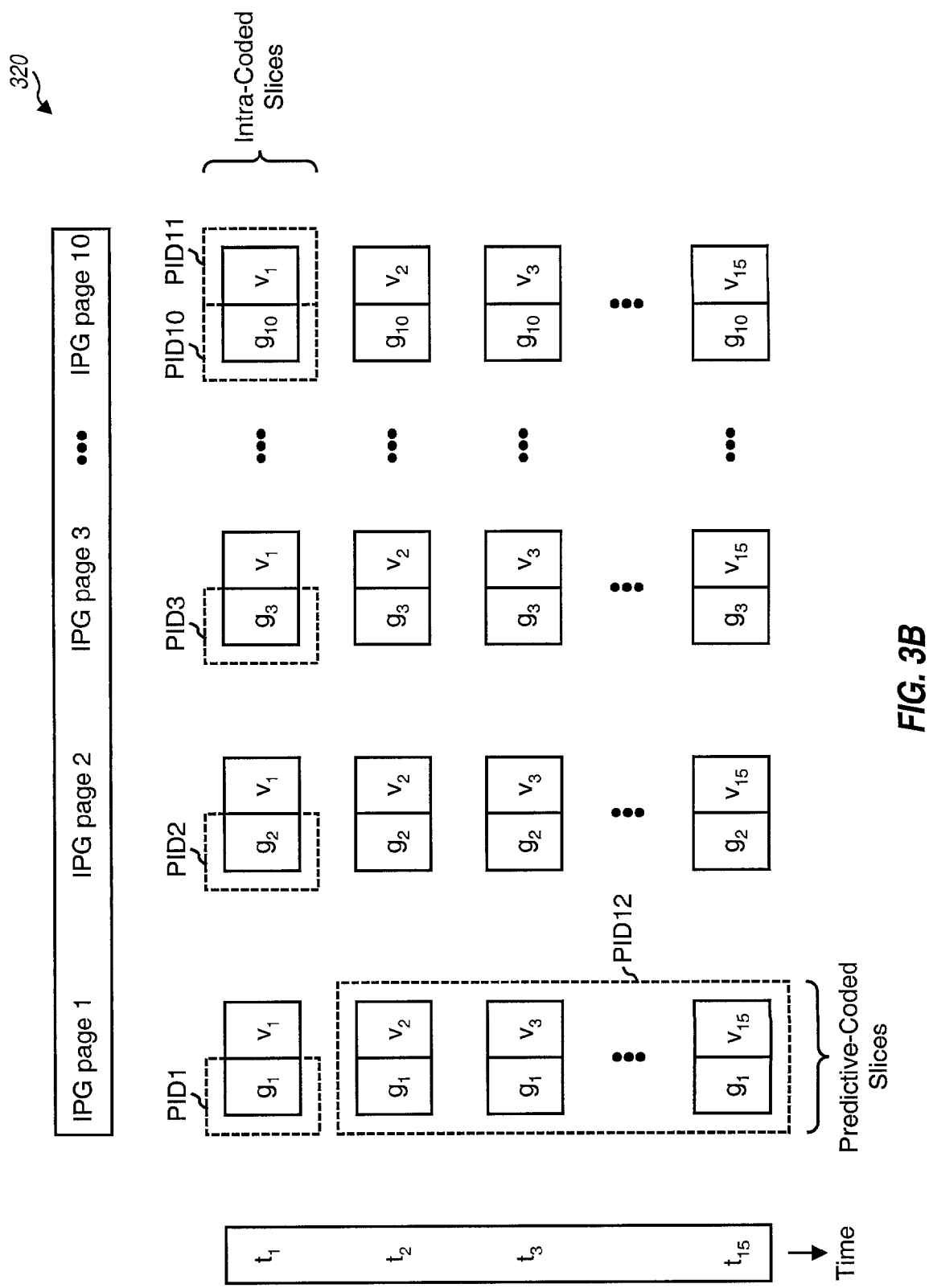

FIG. 3B depicts an embodiment of a data structure 320 that may be used in conjunction with slice-based encoding. In this example, ten IPG pages are available, with each page represented by a respective guide portion (g) and a common video portion (v). For example, IPG page 1 is represented as ($g_1/v_1$), IPG page 2 is represented as ($g_2/v_1$), and so on. In data structure 320, ten guide portions $g_1$ through $g_{10}$ are associated with the video portion ($v_1$). Slice-based encoding is described in the aforementioned U.S. patent application Ser. Nos. 09/686,739 and 09/635,508.

As shown in FIG. 3B, the coded slices for the guide and video portions of the IPG pages can be assigned to a number of PIDs. In FIG. 3B, only the contents that is assigned a PID is delivered to the terminals. The intra-coded guide portions $g_1$ through $g_{10}$ are assigned to PID 1 through PID 10, respectively. One of the common intra-coded video portion $v_1$ (e.g., for IPG page 10) is assigned to PID 11. In this form, substantial bandwidth saving is achieved by delivering the intra-coded video portion $v_1$ only once. Finally, the predictive-coded pictures $g_1/v_2$ through $g_1/v_{15}$ are assigned to PID 12. Again, a substantial saving in bandwidth is achieved by transmitting only one group of fourteen predictive-coded pictures, $g_1/v_2$ through $g_1/v_{15}$. The PID assignment and decoding processes are described in the aforementioned U.S. patent application Ser. No. 09/686,739.

Figure 3C:
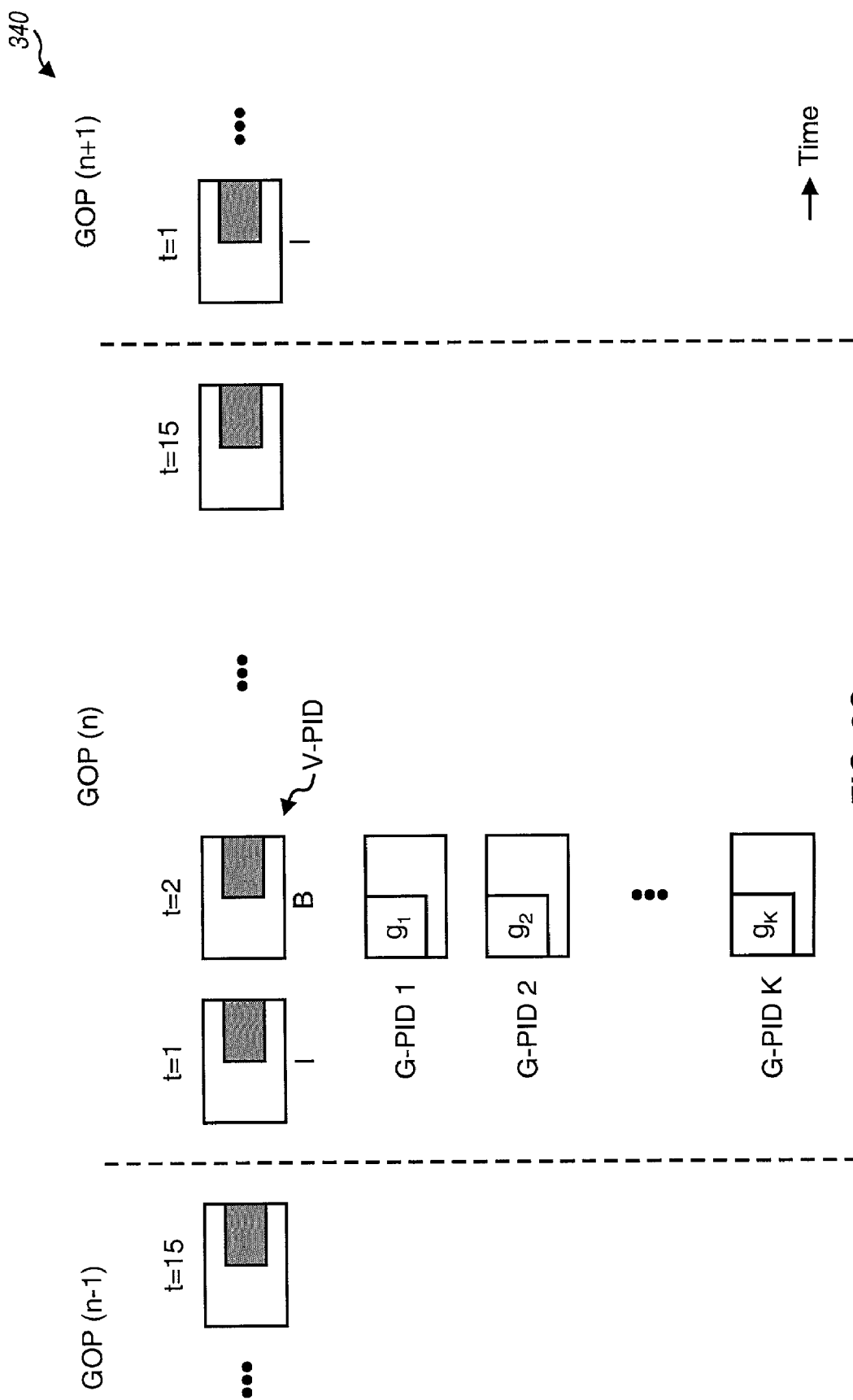

FIG. 3C is a diagram of a data structure 340 that can be used in conjunction with temporal slice persistence encoding. Data structure 340 is a matrix representation for program guide data for a number of IPG pages based on the partitioning of the IPG page shown in FIGS. 2B and 2C. As shown by the shaded portions in FIG. 3C, a video sequence is formed which contains only the video portion of the IPG page (i.e., the portion containing time-varying information). In an embodiment, the coded video sequence contains only slices that belong to the video region. The coded video sequence is assigned a particular PID (e.g., V-PID) and transmitted from the head-end.

For each IPG page, the guide portion (i.e., the portion containing the information specific to that IPG page) is sent in a separate picture frame. Since the guide portion does not change over time, only one picture for each GOP is coded and transmitted. The coded guide frame contains only the slices that belong to the guide portion of a frame. The slice-coded guide portion for each IPG page is assigned a respective PIED (e.g., G-PID) and also transmitted from the head-end.

The presentation times of the guide frames and motion video frames are assigned in accordance with a "temporal slice persistence" fact. In an embodiment (not represented in FIG. 3C), the guide PIDs (i.e., G-PID 1, G-PID 2, and so on) are time stamped to be presented at the end of each GOP at t=15. At t=15, the last motion video frame in the GOP is dropped and the viewer-selected guide page is presented. To achieve this, the video decoder re-combines the selected guide G-PID (e.g., G-PID 1) and the video V-PID via one of the picture-based recombination methods described in the aforementioned U.S. patent application Ser. No. 09/686,739.

The selected guide page is decoded and displayed at t=15, with only the region that contains the guide portion slices being updated on the screen. From that time on, the guide portion of the screen is not updated (i.e., the guide slices temporally persist on the screen) until the viewer selects another guide page. This selection then updates the slices in the guide portion and rewrites the new guide portion on the screen. Similarly, the V-PID frames only change the video portion of the screen and do not update the guide portion, since these motion video frames do not include slices in the guide portion.

The embodiments disclosed with respect to FIG. 3C can be used for broadcast of IPG pages and can further be used for a demand-cast of IPG pages in response to viewer requests. For demand-cast, the head-end can time stamp the requested page to be processed and quickly displayed on the screen in a suitable time index within a GOP to reduce delays. The guide frames and motion video frames can be encoded, delivered, decoded, and displayed in various manners, as described in the aforementioned U.S. patent application Ser. No. 09/686,739.

In another embodiment that is supported by FIG. 3C, the V-PID is encoded to include P and B pictures (e.g., a GOP of I-B-B-P-B-B-P-B-B-P-B-B-P-B-B), and any B picture in the V-PID can be dropped and replaced with a B-coded guide frame that includes "intra-coded" macroblocks. This can be achieved by adjusting the encoding threshold selection that decides whether a macroblock is better to be encoded as intra-coded or as predictive-coded. Any B-coded frame can be dropped and replaced since it is not used as a reference for prediction by any other pictures in a GOP. The guide page frames can be time stamped to be presented, for example, at t=2. Other embodiments for encoding and decoding the guide frames are described in the aforementioned U.S. patent application Ser. No. 09/686,739.

Figure 3D:
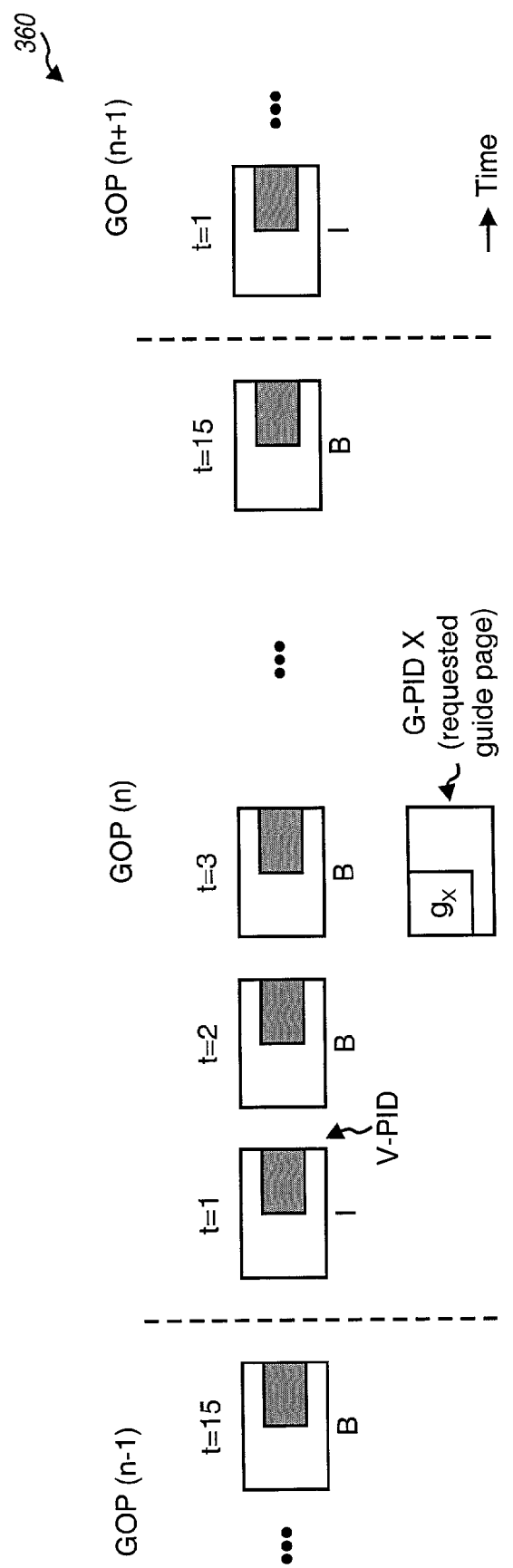
FIG. 3D is a diagram that shows an implementation of demand-cast with the use of temporal slice persistence technique.

FIG. 3D is a diagram that shows an implementation of demand-cast with the use of temporal slice persistence technique. In the example shown in FIG. 3D, a viewer request is received and processed by the head-end, and the requested guide PID is time stamped to be displayed at t=3. In this example, the V-PID is coded to include B frames (e.g., I-B-B-P-B-B-P . . . ), and the B frame at t=3 is dropped and replaced with a B-coded requested guide PID that includes intra-coded macroblocks. The B frame of the V-PID can be dropped at anytime in a GOP since it is not used as a reference for prediction by any other frame in the GOP.

The temporal slice persistence technique can be advantageously employed in a broadcast scenario whereby a large number of guide PIDs (in the order of hundreds) can be efficiently delivered. Since the guide PIDs do not carry full motion barker video, huge bandwidth savings can be achieved. The barker video can be sent as a separate video stream (e.g., V-PID or another PID). The temporal slice persistence technique can also be used to implement other combinations of coding and decoding of guide frames, full motion video frames, and (possibly) other multimedia information in a GOP. The temporal slice persistence technique employs picture-based recombination techniques with slice-based sub-picture updating mechanisms, as described in the aforementioned U.S. patent application Ser. No. 09/686,739.

By exploiting known characteristics of the IPG pages and the temporal slice persistence technique, the transmission of redundant information can be minimized, for example, by employing efficient client-server communication and acknowledgement techniques. For example, the guide portion of a requested IPG page may be sent a limited number of times (e.g., once) in response to a viewer request for the page. This "strobecast" of IPG pages can greatly reduce the load for demand-cast, and may (possibly) be used for the delivery of other contents from the head-end. Strobecast techniques are described in detail in the aforementioned U.S. patent application Ser. No. 09/687,662.

D. Spotlight Window

Figure 4:
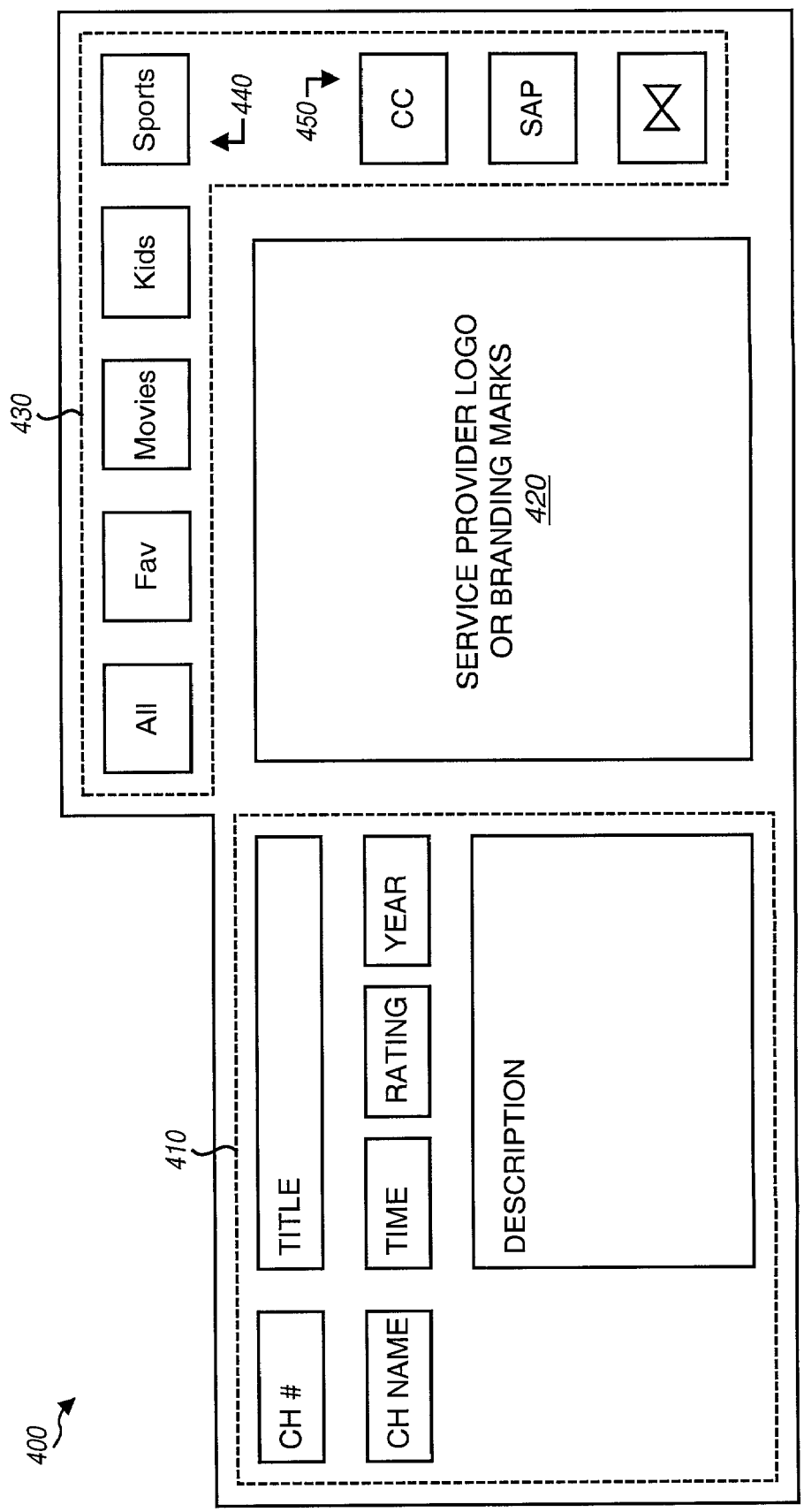
FIG. 4 is a diagram of a specific design of a channel information window (i.e., a spotlight window) that can also be used to efficiently provide IPG information.

FIG. 4 is a diagram of a specific design of a channel information window 400 (also referred to as a "spotlight window") that can also be used to efficiently provide IPG information. The spotlight window can be generated and overlay on top of a video display (e.g., whenever selected by a viewer). In this design, spotlight window 400 includes a specific portion 410, a local portion 420, and a common portion 430. Specific portion 410 includes information specific to a particular broadcast channel being described by spotlight window 400. Local portion 420 includes information targeted for delivery to the terminals within a particular locality. And common portion 430 includes features that are common for a number of spotlight windows (i.e., the background that is common for all broadcast channels and localities). FIG. 4 shows a specific design, and additional and/or different information, layouts, configurations, and arrangements may also be provided for each portion of spotlight window 400.

In the design shown in FIG. 4, specific portion 410 includes the channel number (e.g., "13"), the broadcast channel name (e.g., "USA"), the program title (e.g., "Tremors II: . . . "), the time period of the program (e.g., "9:00-11:00"), the program rating (e.g., "PG"), the copyright or release year (e.g., "1998"), and a brief description (e.g., "The creature from . . . ").

Local portion 420 includes, for example, a logo for the service provider or other branding related information. A different logo may be provided for each region served by a different service provider. Local portion 420 may also be partitioned into a number of smaller sub-portions, with each sub-portion being used to provide different information (e.g., targeted advertisements, locality specific announcements) and may further be associated with a particular localization level (e.g., an entire region, a neighborhood, or a set of terminals).

Common portion 430 includes a filter icon region 440 and an operational icon region 450. Filter icon region 440 includes a number of filter icons used to filter the programs to be displayed in the program guide, e.g., an "All" filter icon, a "Fav" or favorites filter icon, a "Movies" filter icon, a "Kids" filter icon, and a "Sports" filter icon. These filter icons can be designed to provide filtering functionality. Operational icon region 450 includes a close caption icon ("CC"), a secondary audio programming icon ("SAP"), and a stereo icon ("⋈").

In an embodiment, all or portions of the spotlight window are generated at the head-end and sent to the terminals. In this manner, the head-end has control over the particular arrangement (i.e., the layout and configuration) for the spotlight window and the information to be included in the various fields and portions of the spotlight window. Bitmap for all or portions the spotlight window may be encoded at the head-end, packetized, and sent to the terminals (e.g., via an out-of-band network). The spotlight data can be processed by a separate spotlight server that does not interfere with the operations of the session manager or the transport stream processor to send the spotlight data via the out-of-band network.

Techniques for generating, encoding, and delivering spotlight window is described in U.S. patent application Ser. No. 09/691,495, entitled "SYSTEM AND METHOD FOR LOCALIZED CHANNEL INFORMATION WINDOW," filed Oct. 18, 2000, assigned to the assignee of the invention and incorporated herein by reference.

E. Terminal

Figure 5:
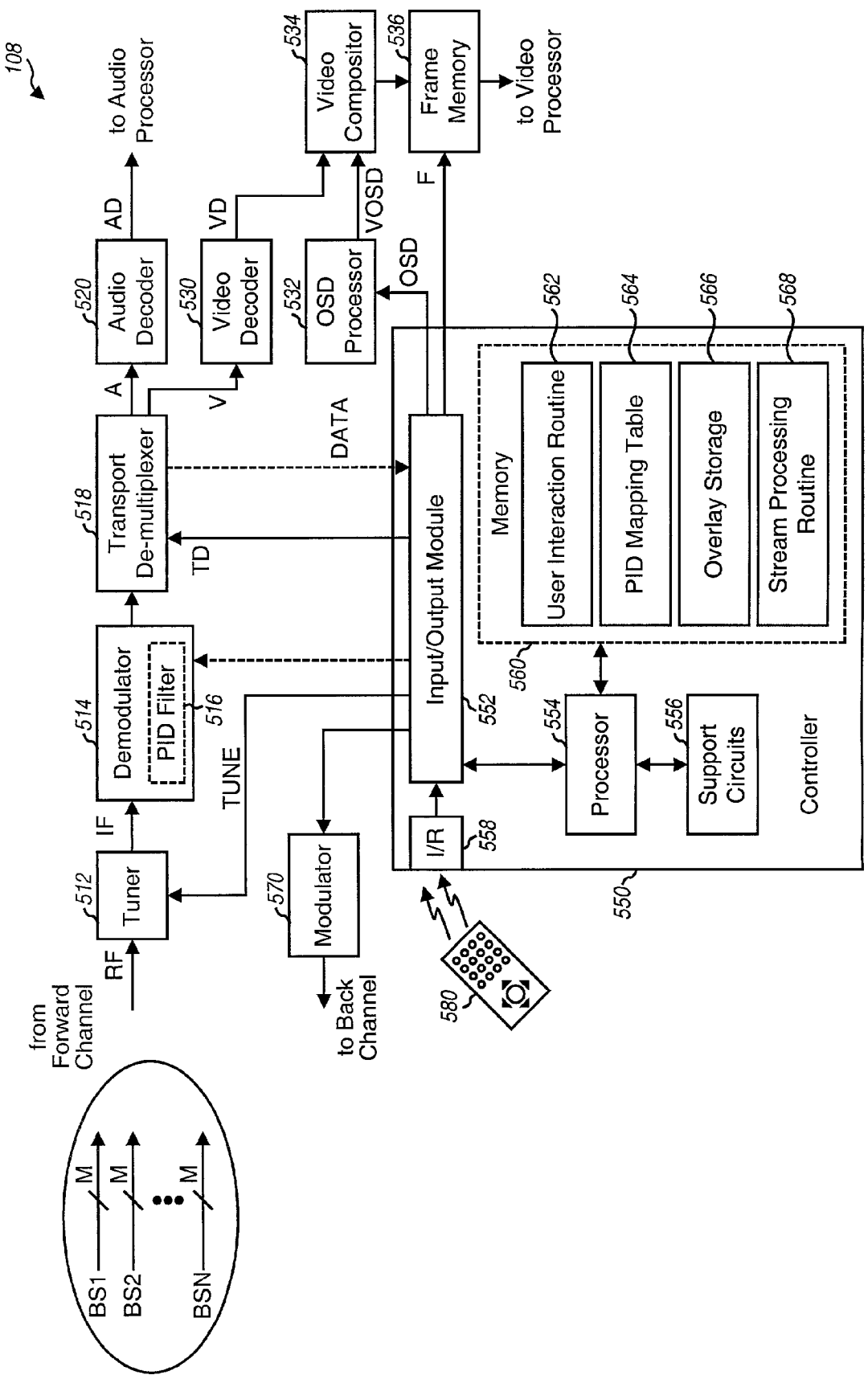
FIG. 5 is a block diagram of an embodiment of terminal capable of providing a display of a user interface and implementing various aspects of the invention.

FIG. 5 is a block diagram of an embodiment of terminal 108, which is also referred to as a set top terminal (STT) or user terminal. Terminal 108 is capable of producing a display of a user interface and implementing various aspects of the invention. Terminal 108 includes a tuner 512, a demodulator 514, a transport demultiplexer (DEMUX) 518, an audio decoder 520, a video decoder 530, an on-screen display (OSD) processor 532, a video compositor 534, a frame store memory 536, a controller 550, and a modulator 570. User interaction is supported via a remote control unit 580. Tuner 512 receives a radio frequency (RF) signal comprising, for example, a number of quadrature amplitude modulated (QAM) signals from a downstream (forward) channel. In response to a control signal TUNE, tuner 512 tunes to and processes a particular QAM signal to provide an intermediate frequency (IF) signal. Demodulator 514 receives and demodulates the IF signal to provide an information stream (e.g., an NPEG transport stream) that is sent to transport stream demultiplexer 518.

Transport stream demultiplexer 518, in response to a control signal TD produced by controller 550, demultiplexes (i.e., extracts) an audio stream A and a video stream V. The audio stream A is provided to audio decoder 520, which decodes the audio stream and provides a decoded audio stream to an audio processor (not shown) for subsequent processing and presentation. The video stream V is provided to video decoder 530, which decodes the compressed video stream V and provides an uncompressed video stream VD to video compositor 534. OSD processor 532, in response to a control signal OSD produced by controller 550, produces a graphical overlay signal VOSD that is provided to video compositor 534.

Video compositor 534 merges the graphical overlay signal VOSD and the uncompressed video stream VD to produce a composed video stream (i.e., the underlying video images with the graphical overlay). Frame store unit 536 receives and stores the composed video stream on a frame-by-frame basis according to the frame rate of the video stream. Frame store unit 536 thereafter provides the stored video frames to a video processor (not shown) for subsequent processing and presentation on a display device. In an embodiment, during transitions between streams for a user interface, the buffers in the terminal are not reset, and the user interface seamlessly transitions from one screen to another.

Controller 550 includes an input/output (I/O) module 552, a processor 554, support circuitry 556, an infrared receiver (I/R) 558, and a memory 560. Input/output module 552 provides an interface between controller 550 and tuner 512, demodulator 514 (for some designs), transport demultiplexer 518, OSD processor 532, frame store unit 536, modulator 570, and a remote control unit 580 via infrared receiver 558.

Processor 554 interfaces with I/O module 552, support circuitry 556 (which may include power supplies, clock circuits, cache memory, and the like), and a memory 560. Processor 554 also coordinates the execution of software routines stored in memory 560 to implement the features and perform the functions supported by the terminal.

Memory 560 stores software routines that support various functions and features, and further stores data that may be used for the user interface. In the embodiment shown in FIG. 5, memory 560 includes a user interaction routine 562, a PID mapping table 564, an overlay storage 566, and a stream processing routine 568. User interaction routine 562 processes user interactions to perform various functions to provide the desired user interface menu. For example, user interaction routine 562 can implement a mask or reveal feature to display (reveal) the desired portion of the IPG page and hide (mask) the undesired portion. User interaction routine 562 may further perform various functions to achieve a demand-cast for a desired IPG page. The mask or reveal is described in U.S. patent application Ser. Nos. 09/293,526 and 08/984,427.

Stream processing routine 568 coordinates the recombination of video streams to form the desired video sequences. Stream processing routine 568 employs a variety of methods to recombine slice-based streams, some of which are described in the aforementioned U.S. Pat. No. 6,754,271. In one recombination method, a PID filter 516 within demodulator 514 is utilized to filter the undesired PIDs and retrieve the desired PIDs from the transport stream. The packets to be extracted and decoded to form a particular IPG page are identified by PID mapping table 564. For most recombination methods, after stream processing routine 568 has processed the streams into the proper order, the slices are sent to video decoder 530 (e.g., an MPEG-2 decoder) to form uncompressed IPG pages suitable for display.

Although controller 550 is depicted as a general-purpose processor that may be programmed to perform specific control functions to implement various aspects of the invention, the controller may also be implemented in hardware as an application specific integrated circuit (ASIC).

In a specific design, remote control unit 580 includes an 8-position joystick, a numeric pad, a "Select" key, a "Freeze" key, and a "Return" key. User manipulations of the joystick or keys on the remote control device are transmitted to controller 550 via an infrared (IR) link or an RF link. Controller 550 is responsive to the user manipulations and executes the appropriate portion of user interaction routine 562 to process the user manipulations.

FIG. 5 shows a specific design of terminal 108. Other designs of the terminal can also be implemented to perform the functions described herein, and these alternative designs are within the scope of the invention.

F. Monitoring System for Information Delivery System

The invention provides techniques to monitor the delivery of programming, guide data, and other information. These techniques may be used for diagnostics, quality control, and other purposes, and may be advantageously employed for various types of information distribution system such as, for example, an interactive program guide (IPG) delivery system, a video-on-demand (VOD) system, and other systems. These techniques allow a system operator to visually verify the contents being delivered to the terminals, check what the viewers may observe, mimic and test interactive experiences of the viewers, observe actual viewing conditions at the terminals, and perform other tests and diagnostics.

1. System

Figure 6:
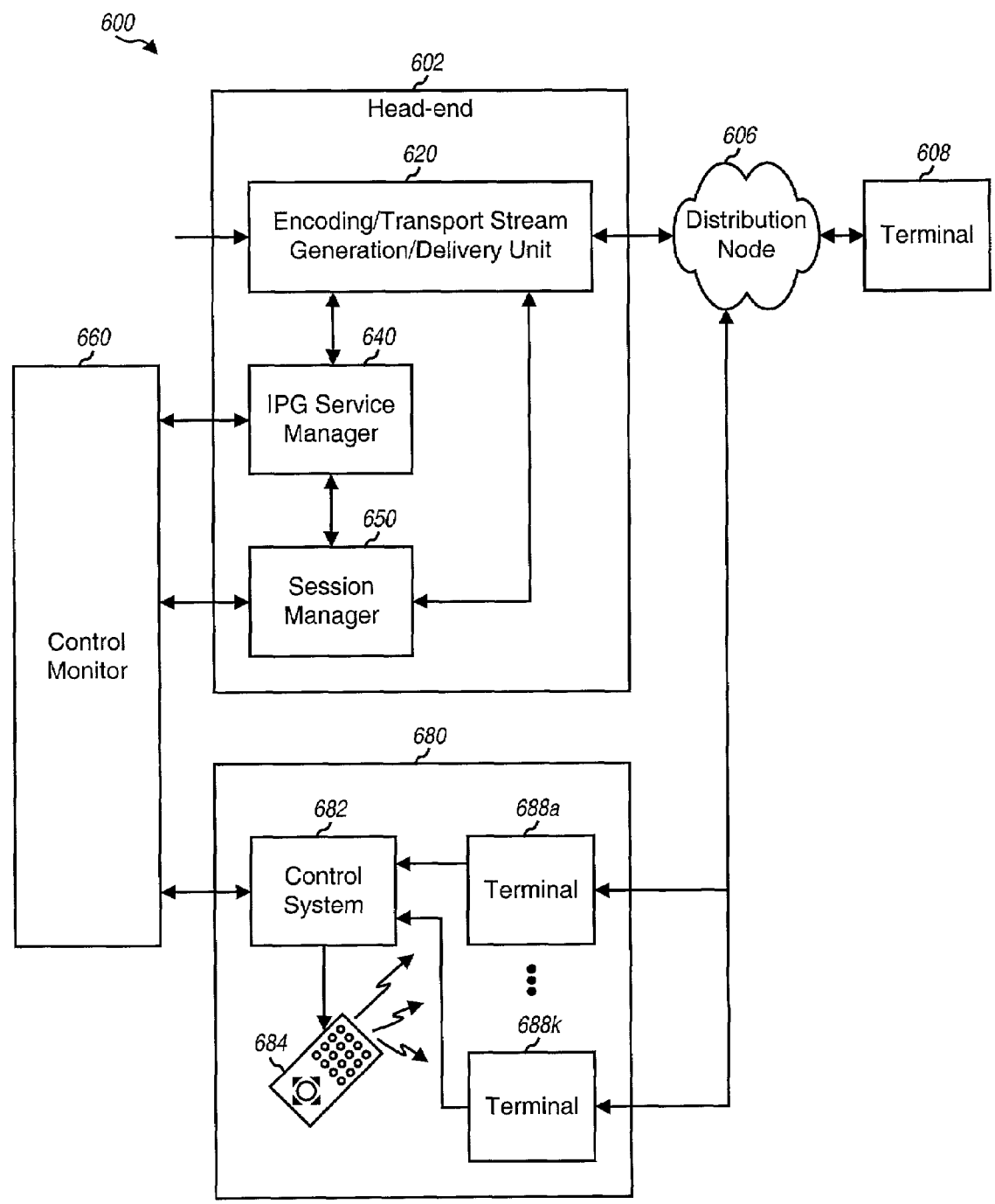
FIG. 6 is a block diagram of an information distribution system for delivering programming guide and other contents and capable of monitoring the delivery of contents.

FIG. 6 is a block diagram of en information distribution system 600 for delivering programming guide and other contents. System 600 is also capable of monitoring (e.g., from a remote location) the delivery of contents and implementing various aspects of the invention. System 600 includes a head-end 602 configured to provide contents (e.g., programming, video-on-demand, interactive program guide, advertisements, and so on) via a distribution node 606 to a number of terminals 608 (only one terminal is shown in FIG. 6 for simplicity).

The design of head-end 602 is typically dependent on the particular contents to be delivered. For example, to provide interactive program guide, head-end 602 includes an encoding/transport stream generation/delivery unit 620, an IPG service manager 640, and a session manager 650.

Encoding/transport stream generation/delivery unit 620 receives contents (e.g., program guide data, video, audio, and other data) from one or more sources external and/or internal to the head-end. Unit 620 then composes the received contents into one or more composed videos, encodes the composed videos, and multiplexes the elementary streams generated for the encoded videos into one or more transport streams. Unit 620 further modulates the transport streams into a form suitable for transmission to the terminals. Unit 620 may be implemented as shown in FIG. 1.

IPG service manager 640 interacts with, and typically further controls, various processing elements within encoding/transport stream generation/delivery unit 620. IPG service manager 640 monitors various parameters associated with the encoding, multiplexing, and delivery processes, and may provide status and diagnostic data that may be used to monitor and manage these processes.

Session manager 650 interacts with IPG service manager 640 and encoding/transport stream generation/delivery unit 620, and further manages the delivery of contents to the terminals. The transport streams transmitted to each distribution node typically include "broadcast" streams (e.g., containing contents continually sent by the head-end) and "demand-cast" streams (e.g., containing contents sent by the head-end in response to requests from the terminals). For some implementations, session manager 650 may monitor the demand-cast streams and usage by the terminals and direct encoding/transport stream generation/delivery unit 620 to generate or tear down demand-cast streams.

In accordance with an aspect of the invention, distribution system 600 further includes a monitor and control unit 660 and a monitoring system 680, the combination of which supports the monitoring of transmitted contents. Via monitor and control unit 660 and monitoring system 680, a system operator is able to verify contents being delivered to the terminals, to test a user interface and interaction model for IPG and other user interfaces, and for other diagnostic purposes.

Monitor and control unit 660 communicates with IPG service manager 640 and session manager 650 within head-end 602 to request for status for various operational parameters and to receive status for such parameters from the head-end. Monitor and control unit 660 may communicate with IPG service manager 640 and session manager 650 via various types of protocols such as, for example, UDP (User Datagram Protocol) and others.

Monitor and control unit 660 further communicates with monitoring system 680 to request the capturing of certain transmitted contents and to receive the captured contents and/or status related to the captured contents. The interconnection between monitor and control unit 660 and monitoring system 680 may be achieved via a local area network (LAN), a wide area network (WAN), the Internet, or some other communication means. Also, various protocols may be used to exchange messages and data between monitor and control unit 660 and monitoring system 680 such as, for example, UDP over IP, TCP over IP, and so on.

Although not shown in FIG. 6, monitor and control unit 660 may couple to a (e.g., Web) server, which may communicate with one or more remote devices. This allows monitor and control unit 660 to report contents received from monitoring system 680, status related to the operation of head-end 602 and monitoring system 680, and other information to the remote devices. In this manner, the operation of information distribution system 600 may be monitored and/or controlled from a remote location. An example remote monitoring and control system is described further in U.S. patent application Ser. No, 09/734,496, entitled "REMOTE MONITORING AND CONTROL METHOD AND APPARATUS FOR AN INFORMATION DISTRIBUTION SYSTEM," filed Dec. 11, 2000, assigned to the assignee of the present application and incorporated herein by reference.

In the embodiment shown in FIG. 6, monitoring system 680 includes a control system 682, a remote control unit 684, and one or more terminals 688. Control system 682 may be implemented with a personal computer that either includes a media (e.g., video and/or audio) capture card or couples to a media capture device. Control system 682 interfaces with, and receives directives (commands) from, monitor and control unit 660. In response to a received directive, control system 682 may direct a particular terminal 688 within monitoring system 680 to provide the requested contents, receive and capture the contents from the selected terminal, and send the captured contents back to monitor and control unit 660.

Remote control unit 684 interfaces with, and receives commands from, control system 682. In response to a received command, remote control unit 684 activates one or more terminals 688 in a manner directed by the received command. The selected terminal(s) may be directed to tune to a new channel, to move about a user interface, or perform some other function. The interface between control system 682 and remote control unit 684 may be mechanical or electrical. The interface between remote control unit 684 and terminals 688 may be via an infrared (IR), RF, or wireline link.

In an embodiment, monitoring system 680 includes one terminal 688 for each terminal model to be monitored. One such terminal model is the DCT-1000 provided by General Instrument Corporation. Monitoring system 680 may thus be used to test various terminal models that may be deployed in the field.

2. Capturing and Reporting of Delivered Information

The operation of the monitoring may proceed as follows. Initially, an instruction is received by monitor and control unit 660 to monitor a particular channel on a particular terminal. This instruction may be received via an operator command or as part of a regular scheduled testing. In response to the received instruction, monitor and control unit 660 sends to control system 682 a message indicative of the desired test to be performed, or a particular channel to be viewed, at a particular terminal. Control system 682 receives the message and, in response, activates the proper keys on remote control unit 684. Remote control unit 684 then sends the activated commands to the selected terminal 688. Remote control unit 684 and terminal 688 can be operated to mimic an actual system that may be deployed at a customer site.

In response to the commands from remote control unit 684, the selected terminal 688 tunes to the selected channel, decodes the elementary streams for the selected channel, and provides the recovered video (and possibly audio and other data) to control system 682. As noted above, control system 682 may employ a media capture unit to capture and digitize the contents provided by the selected terminal 688.

Various media capture schemes may be employed by control system 682 depending on various factors such as, for example, the type and amount of information desired to be collected, the capabilities of the media capture unit associated with the control system, the transmission capability of the network interconnecting the control system and the monitor and control unit, and so on.

In one media capture scheme, control system 682 captures a frame of video at a time and sends the captured video frame back to monitor and control unit 660. This captured video frame may be sent as graphics (e.g., a bitmap) or via some other format. In another media capture scheme, control system 682 continuously captures the video from the selected terminal and sends the captured contents as a full motion video to monitor and control unit 660. The captured video frame or full motion video may be sent at full resolution (i.e., full size screen) or may be sent at a reduced size (e.g., to reduce the amount of data required to be sent).

3. Applications

The techniques described herein for monitoring and reporting delivered contents may be used for various applications. In one application, these techniques may be used to visually verify the contents being delivered to the terminals. This may be achieved by commanding a particular terminal to tune to one or more selected channels and send back contents from the selected channel(s). This allows a system operator to verify that the contents are properly delivered and received.

In another application, the techniques described herein may be used to test a user Interaction model for a user interface. A particular terminal may be directed to cycle through a sequence of commands, and the captured contents may be analyzed to verify proper operation of the user interface. In yet another application, the techniques may be used to observe viewing conditions at the terminals.

For clarity, various aspects of the invention are specifically described for an IPG delivery system and an IPG user interface. These techniques may also be used for numerous other types of information distribution system, such as data delivery systems, program delivery systems, and so on, and for other user interfaces.

The foregoing description of the preferred embodiments is provided to enable any person skilled in the art to make or use the invention. Various modifications to these embodiments will be readily apparent to those skilled in the art, and the generic principles defined herein may be applied to other embodiments without the use of the inventive faculty. Thus, the invention is not intended to be limited to the embodiments shown herein but is to be accorded the widest scope consistent with the principles and novel features disclosed herein.

What is claimed is:

1. A method for monitoring operation of a television distribution system comprising provider equipment and subscriber equipment, said method comprising:

receiving, at a control unit, a directive for a television distribution system operator to use a particular terminal under control of the system operator and remote from the subscriber equipment to monitor a particular channel within a plurality of channels transmitted from a head-end of the provider equipment to the subscriber equipment through a distribution node of the television distribution system, wherein the directive is received at the control unit through a communications means not including the distribution node of the television distribution system;

sending a command to the particular terminal, the command indicative of the particular channel to be monitored;

receiving, at the particular terminal, content being transmitted on the particular channel through the distribution node of the television distribution system, wherein the content is being provided by the provider equipment to the subscriber equipment using the particular channel;

capturing the received content; and reporting the captured content.

2. The method of claim 1, wherein the reported contents are used to verify delivery of contents from the television distribution system.

3. The method of claim 1, wherein the reported contents are used to verify operation of a user interface at the particular terminal.

4. The method of claim 1, wherein the received contents are captured as one or more video frames.

5. The method of claim 1, wherein the received contents are captured as a video sequence.

6. The method of claim 1, wherein the captured contents are reported as a bitmap.

7. The method of claim 1, wherein the directive is received as part of a regular monitoring schedule.

8. The method of claim 1, wherein the command is sent to a remote control unit.

9. The method of claim 1, wherein the particular terminal is selected from among a plurality of terminals comprising at least one model operable to mimic a terminal in the subscriber equipment.

10. A monitoring system, operative to monitor operation of a television distribution system comprising provider equipment and subscriber equipment, the monitoring system comprising:

one or more terminals under control of a television distribution system operator and remote from the subscriber equipment, each terminal operative to receive commands and provide requested content; and a control unit configured to receive a directive for the system operator to monitor a particular channel within a plurality of channels at a selected one of the one or more terminals, said plurality of channels providing content from at least one head-end of the provider equipment to at least one subscriber terminal of the subscriber equipment through a distribution node of the television distribution system, wherein the directive is received at the control unit through a communication means not including the distribution node of the television distribution system, send a command to the selected terminal, receive content of the particular channel at the selected terminal through the distribution node of the television distribution system, wherein the content is being provided by the provider equipment to the subscriber equipment using the particular channel, and capture and report the received content.

11. The monitoring system of claim 10, further comprising:

a monitor and control unit operatively coupled to the control unit and configured to provide the directive to monitor the particular channel at the selected terminal.

12. The monitoring system of claim 11, wherein the monitor and control unit is further configured to provide a set of directives to test user interaction at the selected terminal.

13. The monitoring system of claim 11, wherein the monitor and control unit is further configured to provide a set of directives to verify proper delivery of contents on a plurality of channels to a plurality of terminals.

14. The monitoring system of claim 10, wherein the command directs the selected terminal to tune to the particular channel.

15. The monitoring system of claim 10, further comprising:
a remote control unit configured to receive the command from the control unit and direct the selected terminal to tune to the particular channel.

16. The monitoring system of claim 10 and including a plurality of terminals of a plurality of terminal models deployable in the subscriber equipment.

17. The monitoring system of claim 10, wherein the control unit includes
a media capture unit configured to capture the contents received from the selected terminal.

18. The monitoring system of claim 17, wherein the media capture unit is configured to capture the contents received from the selected terminal as one or more video frames.

19. The monitoring system of claim 17, wherein the media capture unit is configured to capture the contents received from the selected terminal as a video sequence.

20. A monitoring system, operative to monitor delivery of content in a television distribution system comprising provider equipment and subscriber equipment, the monitoring system comprising:
a plurality of terminals under control of a television distribution system operator and remote from the subscriber equipment, each terminal operative to receive commands and provide requested content;
a monitor and control unit configured to provide a directive for the system operator to use a selected terminal of the plurality of terminals to monitor a particular channel within a plurality of channels, said plurality of channels providing content to at least one subscriber terminal of the subscriber equipment through a distribution node of the television distribution system, wherein the directive is received at the monitor and control unit through a communication means not including the distribution node of the television distribution system; and
a control system configured to
receive the directive from the monitor and control unit,
send a command to the selected terminal,
receive content of the particular channel at the selected terminal through the distribution node of the television distribution system, wherein the received content is being provided by the provider equipment to the subscriber equipment using the particular channel, and
capture and report the received content.

* * * * *